United States Patent
Li

(10) Patent No.: US 9,410,701 B1
(45) Date of Patent: Aug. 9, 2016

(54) GAS VALVE

(71) Applicant: Ningbo Chaoyang Household Gas Stoves Co., Ltd., Ningbo (CN)

(72) Inventor: Xueya Li, Ningbo (CN)

(73) Assignee: Ningbo Chaoyang Household Gas Stoves Co., Ltd., Ningbo (CN)

( * ) Notice: Subject to any disclaimer, the term of this patent is extended or adjusted under 35 U.S.C. 154(b) by 0 days.

(21) Appl. No.: 14/805,172

(22) Filed: Jul. 21, 2015

(30) Foreign Application Priority Data

Apr. 21, 2015 (CN) .......................... 2015 1 0188512

(51) Int. Cl.
| | |
|---|---|
| *F16K 11/085* | (2006.01) |
| *F23N 1/00* | (2006.01) |
| *F16K 11/076* | (2006.01) |
| *F16K 31/50* | (2006.01) |
| *F16K 31/60* | (2006.01) |
| *F16K 5/10* | (2006.01) |

(52) U.S. Cl.
CPC ............... *F23N 1/007* (2013.01); *F16K 5/103* (2013.01); *F16K 11/076* (2013.01); *F16K 31/50* (2013.01); *F16K 31/60* (2013.01); *F23N 2035/12* (2013.01); *F23N 2035/24* (2013.01)

(58) Field of Classification Search
CPC ............... Y10T 137/86871; Y10T 137/86823; F23N 1/007; F23N 2035/24; F16K 5/103
USPC ........ 137/606, 625.41, 625.47; 251/207, 208, 251/209, 310, 311
See application file for complete search history.

(56) References Cited

U.S. PATENT DOCUMENTS

| | | | | |
|---|---|---|---|---|
| 2,298,771 A | * | 10/1942 | Lamar ...................... | F16K 5/12 137/625 |
| 2,652,226 A | * | 9/1953 | Huff ..................... | F16K 35/027 137/599.17 |
| 2,855,957 A | * | 10/1958 | Lamar ...................... | F16K 5/12 137/625.32 |
| 3,273,595 A | * | 9/1966 | Novak ...................... | F16K 5/10 137/597 |
| 3,292,660 A | * | 12/1966 | Zarybnicky ........... | F16K 5/0214 137/599.17 |
| 4,622,946 A | * | 11/1986 | Hurley .................... | F24C 3/085 126/214 D |
| 5,067,651 A | * | 11/1991 | Genbauffe ............. | F23N 1/007 236/15 A |
| 7,942,164 B2 | * | 5/2011 | Hsiao ...................... | F23N 1/007 137/625.47 |
| 9,200,807 B2 | * | 12/2015 | Albizuri .................. | F23N 1/007 |
| 2005/0178450 A1 | * | 8/2005 | Tupa ...................... | F16K 11/083 137/625.47 |
| 2011/0174405 A1 | * | 7/2011 | Jones ...................... | F23N 1/007 137/625.47 |

\* cited by examiner

*Primary Examiner* — John K Fristoe, Jr.
*Assistant Examiner* — Reinaldo Sanchez-Medina
(74) *Attorney, Agent, or Firm* — Wang Law Firm, inc.

(57) ABSTRACT

A gas valve includes a valve body and a valve core; the valve core has a center hole and an inlet hole defined in the peripheral surface of the valve core and capable of aligning with the inlet of the valve body and in communication with the center hole of the valve core; an auxiliary inlet with two ends is defined in the valve body linking the inlet with the chamber of the valve body; an auxiliary inlet hole is defined in the peripheral surface of the valve core and capable of aligning with the auxiliary inlet, the auxiliary inlet hole is in communication with the center hole of the valve core, and the auxiliary inlet hole is defined away from the inlet hole. The gas valve with the separated inlet hole and auxiliary inlet hole can reduce the operational error during the adjustment of the gas flow rate.

3 Claims, 8 Drawing Sheets

GAS VALVE

RELATE APPLICATIONS

This application claims the benefit of Chinese invention Application 201510188512.X, filed on Apr. 21, 2015, the specification of which is incorporated herein by this reference.

FIELD OF THE INVENTION

The present invention relates to a valve for a gas stove.

DESCRIPTION OF THE PRIOR ART

A gas valve in a gas stove is a manual operating valve for controlling gas supply. A common gas valve generally includes a valve body with an inlet passage and an outlet passage, a rotatable valve core is disposed in the valve body, a spring recess is formed in the upper portion of the valve core, a center hole is formed in the lower portion of the valve core, a valve rod capable of driving the valve core to rotate is penetrated on the valve body, a spring for enabling the valve rod to move upwards and deviating the connection trend with the valve core is disposed at the lower end of the valve rod, the spring is located in the spring recess on the valve core, and a large fire hole and a small fire hole used for communicating the inlet passage and the outlet passage are formed in the side wall of the center hole of the valve core. When in use, the outlet passage of the valve body is connected with a gas nozzle through a hose, the gas nozzle enters a combustor of the gas stove, a user operates the valve rod through a turn button disposed on an operating panel of the gas stove, presses the turn button and rotates the turn button to drive the valve core to rotate, in order to communicate the large fire hole on the valve core with the inlet passage in the valve body, and a gas source can be ejected from the nozzle through the inlet passage, the large fire hole, the center hole and the outlet passage to be used by the combustor. When transferring to a small fire, the user continues to rotate the turn button to communicate the small fire hole on the valve core with the inlet passage in the valve body, in order to reduce the flow passage of the gas source to achieve the purpose of reducing the fire. By rotating the valve core, the gas stove can be converted between the big fire and the small fire.

Nowadays, with the development and utilization of a variety of energy sources, a variety of gas sources can be used in the gas stove, for example, liquefied petroleum gas, natural gas, dimethyl ether and the like. Different gas sources have different characteristics, heat load, combustion potential and other parameters are different, and different gases must use different gas valves to guarantee full combustion of the gases. Therefore, when the gas source of the gas stove is changed, the gas valve or even the entire gas stove needs to be changed at the same time, thereby greatly increasing the change cost. Therefore, a gas valve in which the gas source flow rate can be conveniently adjusted to adapt to different gas sources needs to be provided.

To solve this problem, the gas valve with a compensation gas passage in the valve body has appeared, for example, a gas rotary valve disclosed by the Chinese patent CN201487275U includes a valve body, a valve core, a valve cover, a valve rod and an adjustable locating rod, wherein a large fire hole, a first small fire hole and a second small fire hole are formed on the circumferential surface of the valve core, a locating pin is disposed at the tail of the valve rod, a first step, the tail of the adjustable locating rod and a second step, which are disposed at intervals and can respectively block the locating pin from rotating, are disposed in the center hole of the valve cover, and when the locating pin rotates to prop against the tail of the adjustable locating rod to be limited, the first small fire hole of the valve core is just communicated with the inlet passage of the valve body. In the above patent, different fire holes on the valve core are aligned to the inlet passage of the valve body to adjust the gas flow rate of the gas valve, so as to adapt to different gas sources. However, in this change and adjustment manner, only one inlet passage is provided, only professionals can carry out the change and the adjustment, otherwise a misoperation is liable to generate to cause danger, moreover, the production requirements are higher, and a higher precision of the processing of the gas valve is required.

SUMMARY OF THE INVENTION

It is an object of the present invention to provide a gas valve capable of adapting to different gas sources, in which the gas flow rate in a gas pipeline can be adjusted to enable the gas valve to adapt to different gas sources.

For achieving this object, a gas valve comprises: a valve body having a chamber and an inlet, the inlet connecting outside with the chamber; a valve core rotatably disposed inside the chamber, the valve core having a center hole, a peripheral surface, and an inlet hole defined in the peripheral surface of the valve core and capable of aligning with the inlet of the valve body; wherein an auxiliary inlet with two ends is defined in the valve body linking the inlet with the chamber of the valve body; an adjusting mechanism is disposed inside the auxiliary inlet for adjusting a flow rate of the gas passing through the auxiliary inlet; an auxiliary inlet hole is defined in the peripheral surface of the valve core and capable of aligning with the auxiliary inlet, both the auxiliary inlet hole and the inlet hole are in communication with the center hole of the valve core, and the auxiliary inlet hole is defined away from the inlet hole; when the inlet hole of the valve core is in communication with the inlet, the auxiliary inlet hole is not in communication with the auxiliary inlet, when the auxiliary inlet hole is in communication with the auxiliary inlet, the inlet hole of the valve core is not in communication with the inlet.

For the convenience of processing, the auxiliary inlet is composed of a first inlet, a second inlet and a third inlet, the first inlet is in communication with the inlet, the second inlet can communicate with the auxiliary inlet hole, the third inlet is in communication with the first inlet and the second inlet, and the third inlet has an external end in communication with the outside, the adjusting mechanism is located at a joint between the second inlet and the third inlet.

Preferably, the adjusting mechanism is a screw, and the screw is inserted into the third inlet.

Preferably, the screw has a front portion, a through hole is defined in the front portion transversal to an axis of the screw, a hole is defined in the front surface along the axis of the screw, the hole is in communication with the through hole, the screw can move inside the third inlet to adjust the flow rate.

In order to conveniently adjust the gas flow rate, the third inlet is a stepped hole, and further comprises a first segment having a smaller inner diameter close to the first inlet and a second segment having a larger inner diameter close to the second inlet, the joint between the second inlet and the third inlet is located on the second segment and near a junction between the first segment and the second segment, the screw is inserted toward the first segment from the second segment, the screw has a spiral portion with an outer diameter matching with an inner diameter of the second segment for blocking the third inlet, and the front portion has an outer diameter smaller than that of the spiral portion and larger than an inner diameter of the first segment.

Preferably, the front portion of the screw has a front end in truncated cone shape, and the front end has a diameter smaller than the inner diameter of the first segment.

To limit the movement of the screw, the screw has a rear portion with an outer diameter larger than the outer diameter of the spiral portion, the second segment has an outer end, the third inlet further comprise a third segment attached to the outer end of the second segment, the rear portion is located at the third segment and clamped at the outer end of the second segment.

Compared with the prior art, in the present invention, the gas valve can adjust the flow rate of the gas in the inlets to enable the gas valve to the gas valve to adapt to different gas supplies; the gas valve with the separated inlet hole and auxiliary inlet hole can reduce the operational error during the adjustment of the gas flow rate; the adjustment of the gas flow rate is more conveniently and simply, and the requirements on processing the gas valve are low, which is easy for manufacturing and production, and the production efficiency is improved.

DETAILED DESCRIPTION OF THE PREFERRED EMBODIMENT

Figure 1:
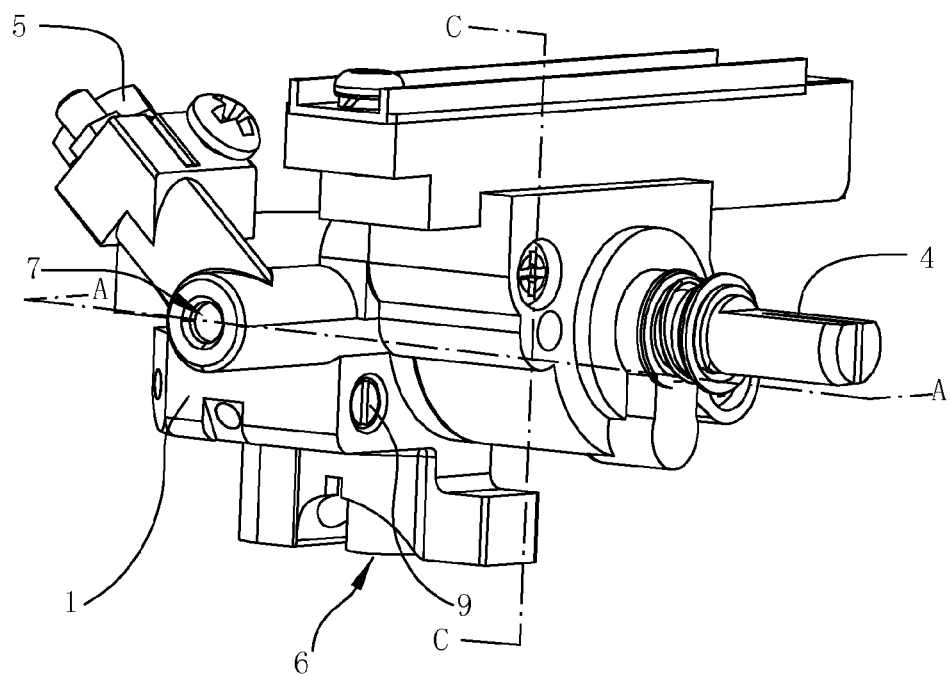
FIG. 1 is a perspective view of a gas valve in accordance with an embodiment of the present invention.
Figure 2:
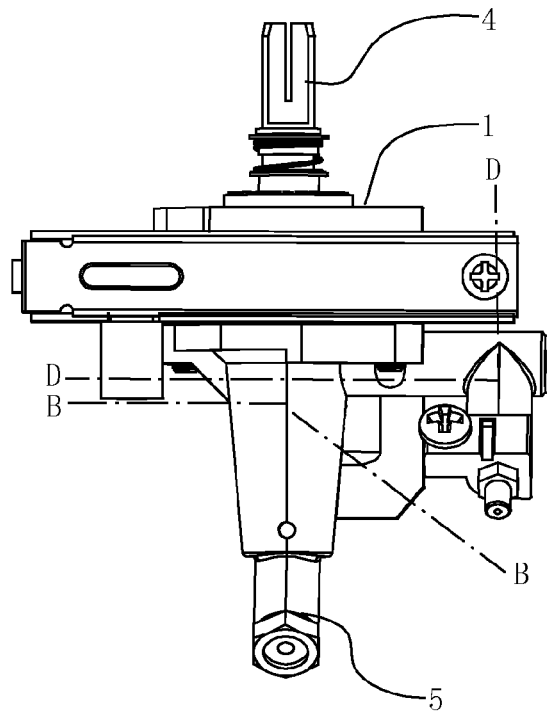
FIG. 2 is a top plan view of the gas valve in accordance with the embodiment of the present invention.
Figure 3:
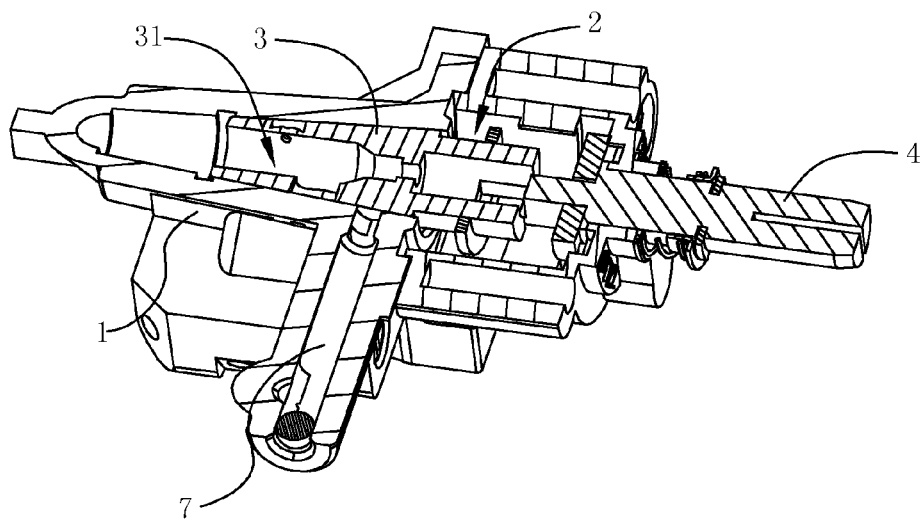
FIG. 3 is a sectional view of A-A of FIG. 1.
Figure 4:
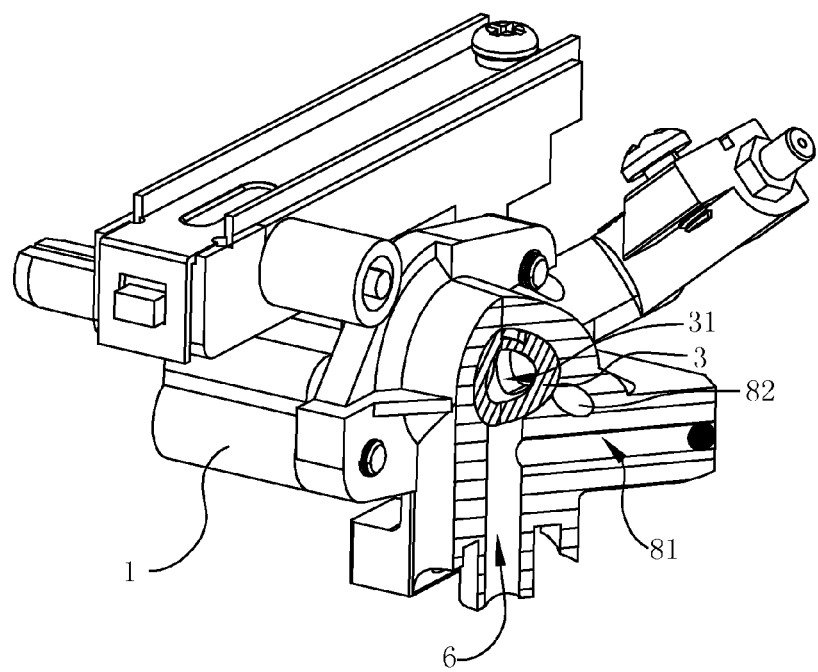
FIG. 4 is a sectional view of B-B of FIG. 2.
Figure 5:
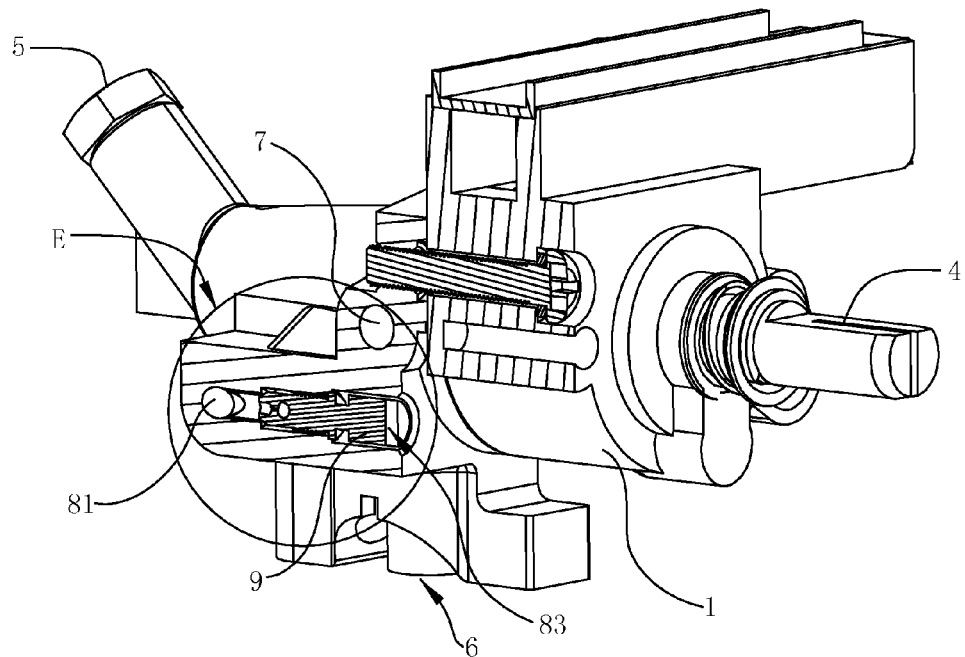
FIG. 5 is a sectional view of C-C of FIG. 1.
Figure 6:
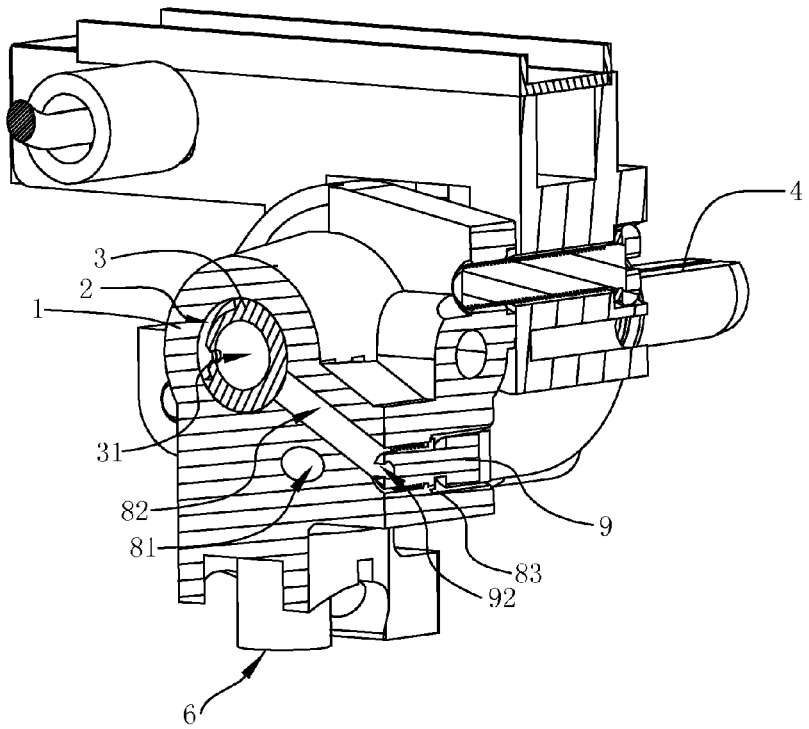
FIG. 6 is a sectional view of D-D of FIG. 2.

To enable a further understanding of the innovative and technological content of the invention herein, refer to the detailed description of the invention and the accompanying drawings below:

As shown in FIG. 1 to FIG. 6, in the present invention, the gas valve comprises a valve body 1 with a chamber 2, a valve core 3 rotatably disposed inside the chamber 2. The valve core 3 has a center hole 31 extending along the axis of the valve core 3, the valve body 1 has a first end with a rotating shaft 4, the rotating shaft 4 is inserted into the chamber 2 and drives the valve core 3 to rotate, the valve body 1 has a second end with a nozzle 5, the nozzle 5 is in communication with the center hole 31 of the valve core 3.

The valve body 1 has an inlet 6, the inlet 6 connecting outside with the chamber 2, the inlet 6 is for feeding gas, the gas enters into the chamber 2 of the valve body 1 through the inlet 6 and is ejected from the nozzle 5 through the valve core 3 disposed in the chamber 2. The valve body 1 has a bypass ignition passage 7 in communication with the chamber 2 of the valve body.

The valve core 3 has a peripheral surface, an inlet hole 32 defined in the peripheral surface of the valve core 3 and capable of aligning with the inlet 6 of the valve body 1; when the valve core 3 is rotated to a certain angle, the inlet hole 32 is in communication with the inlet 6 to enable the external gas to enter the inlet hole 32 through the inlet 6, so as to enter the center hole 31 of the valve core 3 to input the gas.

An auxiliary inlet with two ends is defined in the valve body 1, an auxiliary inlet hole 33 is defined in the peripheral surface of the valve core 3 and capable of aligning with the auxiliary inlet. When the valve core 3 is rotated to a certain angle, the auxiliary inlet hole 33 can communicate with the auxiliary inlet and the center hole 31 of the valve core 3.

Figure 7:
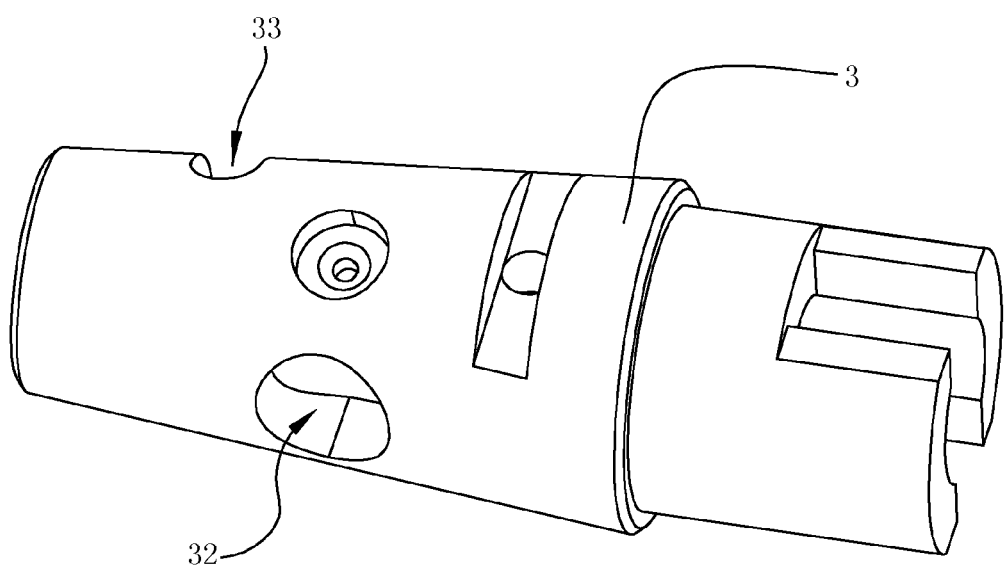
FIG. 7 is a perspective view of the valve core of the gas valve in accordance with the embodiment of the present invention.
Figure 8:
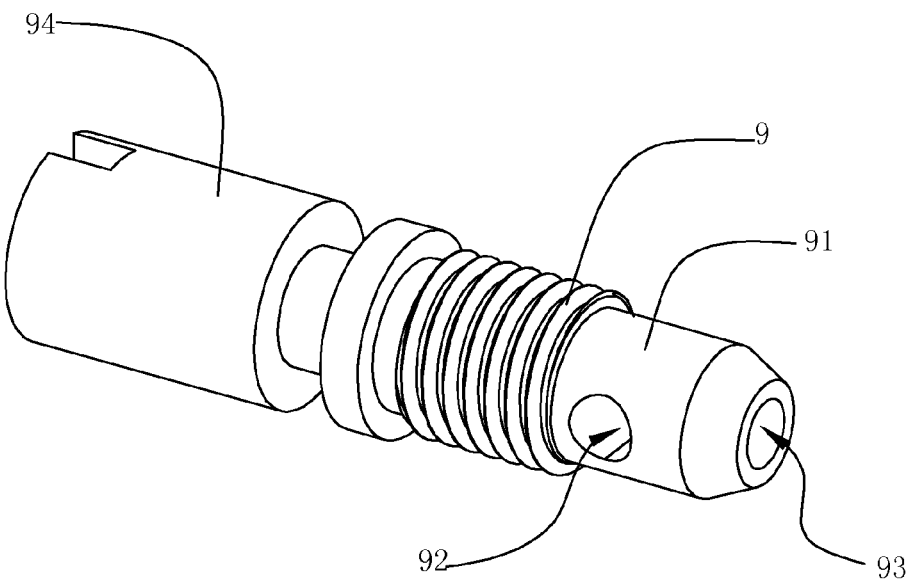
FIG. 8 is a perspective view of the screw of the gas valve in accordance with the embodiment of the present invention.
Figure 9:
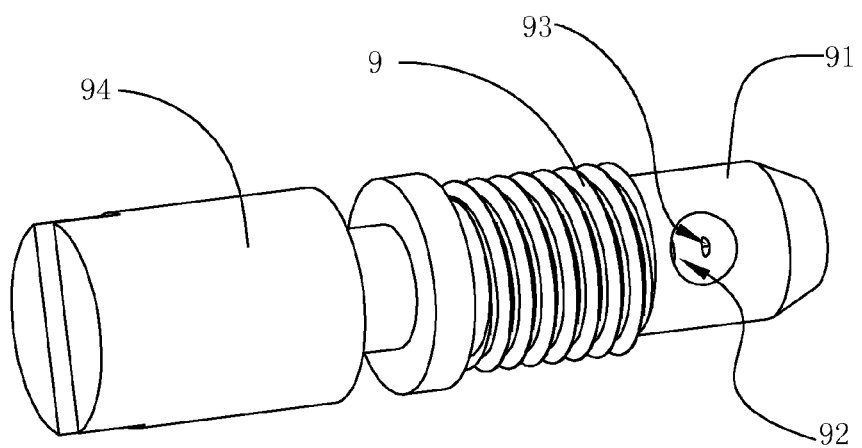
FIG. 9 is another perspective view of the screw of the gas valve in accordance with the embodiment of the present invention.
Figure 10:
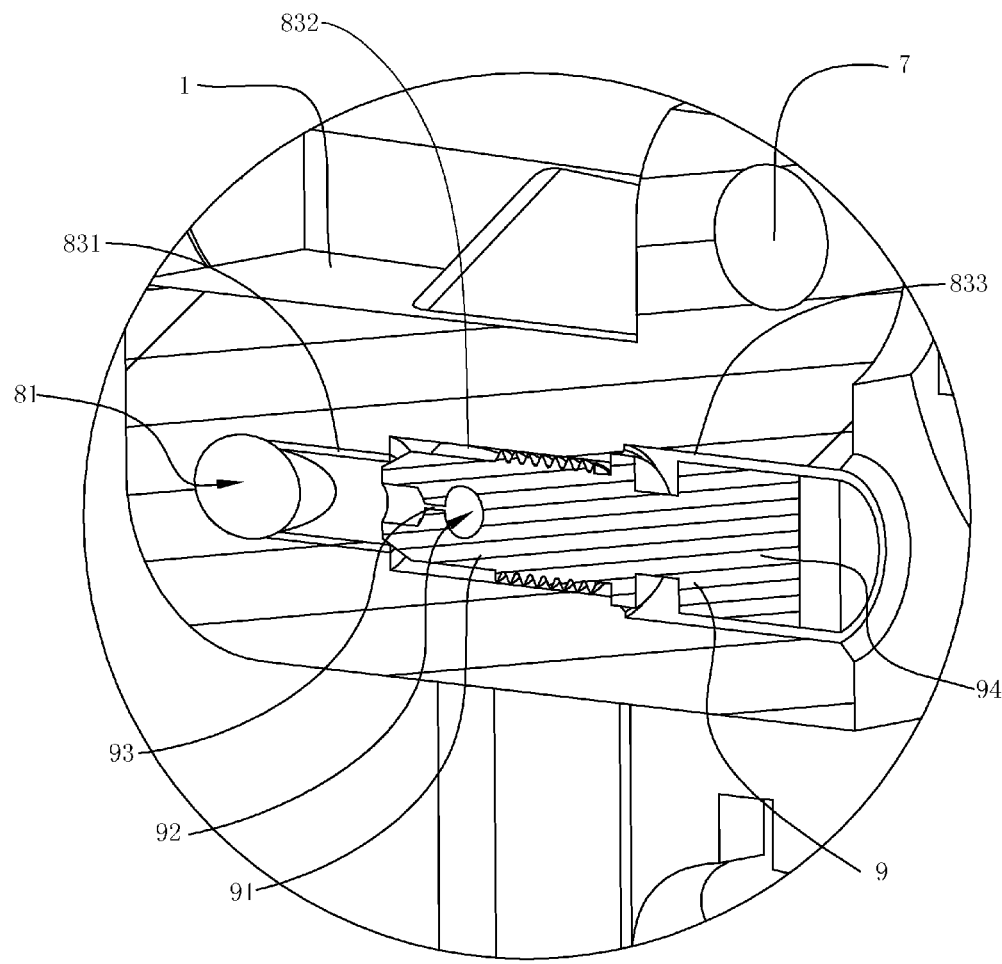
FIG. 10 is an enlarged view of Part-E of FIG. 5.
Figure 11:
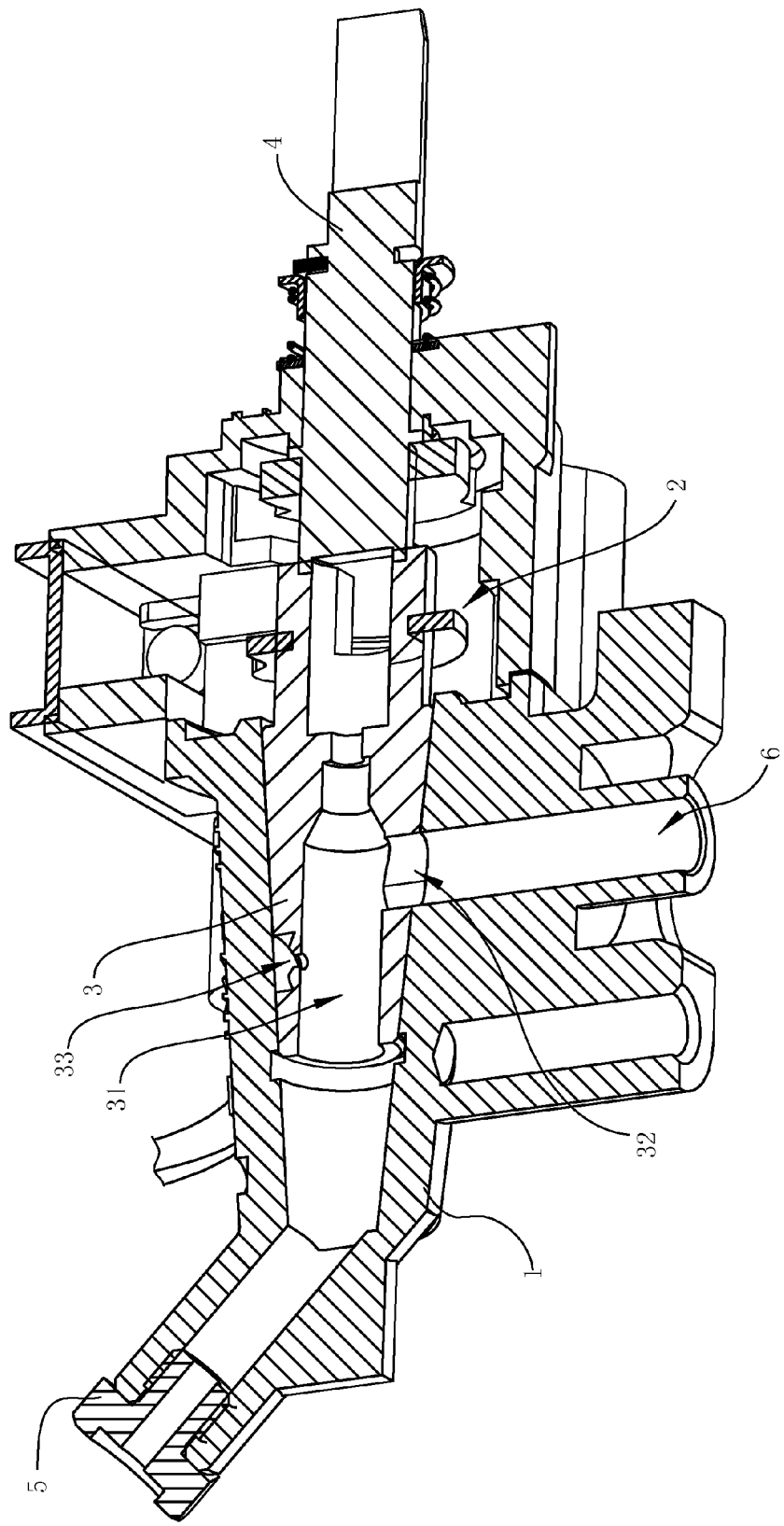
FIG. 11 is a sectional view of the gas valve in accordance with the embodiment of the present invention, when the inlet hole is in communication with the inlet.

Moreover, as shown in FIG. 7, the auxiliary inlet hole 33 is defined away from the inlet hole 32 at the axis direction and the annular direction of the valve core 3. So that, when the inlet hole 32 of the valve core 3 is in communication with the inlet 6, the auxiliary inlet hole 33 is not in communication with the auxiliary inlet, as shown in FIG. 11. When the auxiliary inlet hole 33 is in communication with the auxiliary inlet, the inlet hole 32 of the valve core 3 is not in communication with the inlet 6, as shown in FIG. 12.

Figure 12:
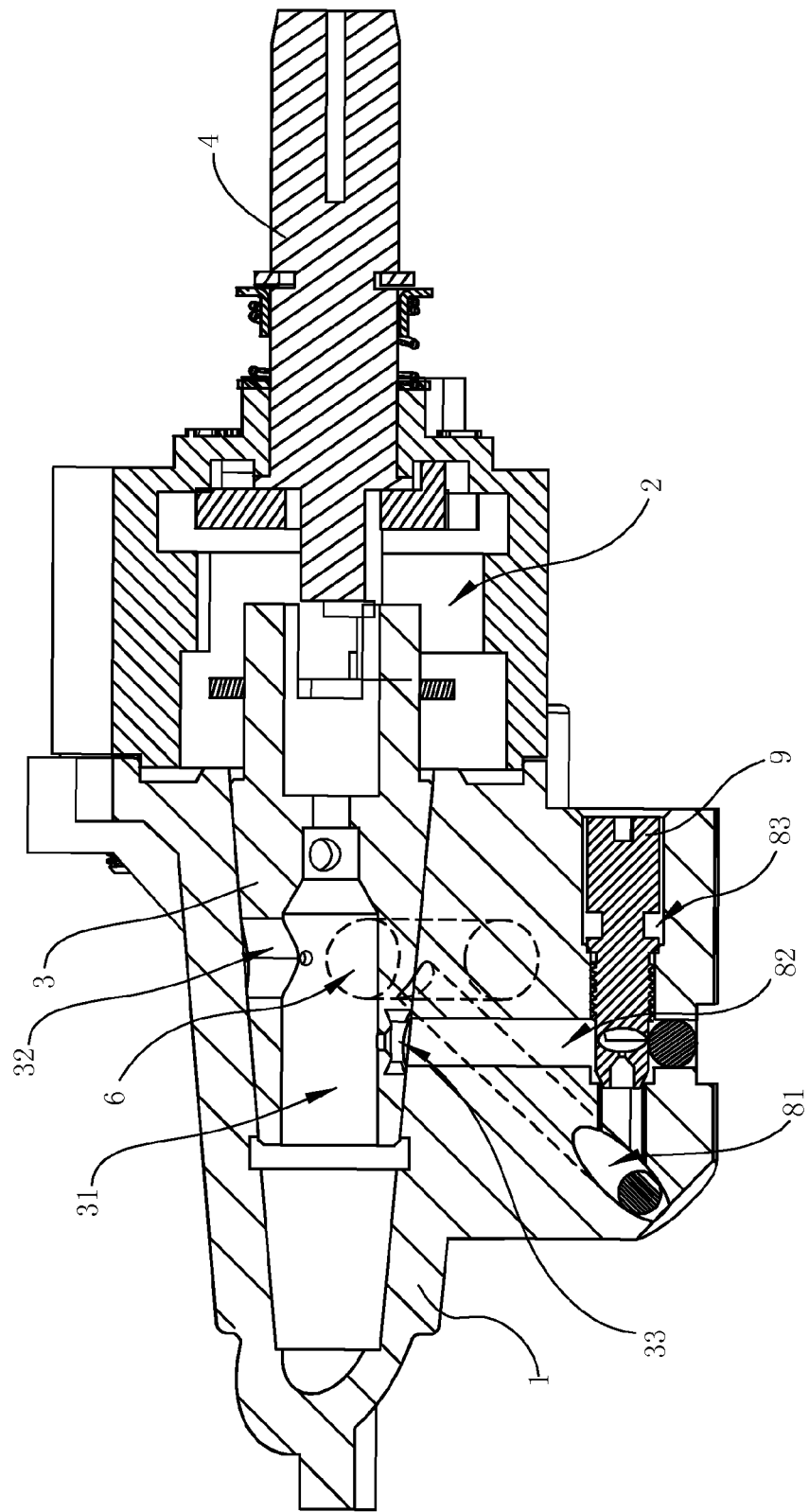
FIG. 12 is a sectional view of the gas valve in accordance with the embodiment of the present invention, when the auxiliary inlet hole is in communication with the auxiliary inlet.

As shown in FIG. 12, one end of the auxiliary inlet is in communication with the inlet 6, the other end of the auxiliary inlet can communicate with the center hole 31 of the valve core 3, that is, when the valve core 3 is rotated to a certain angle and the auxiliary inlet hole 33 faces the auxiliary inlet, then the gas supplied to the inlet 6 will pass the auxiliary inlet and the auxiliary inlet hole 33, then enter into the center hole 31 of the valve core 3, therefore, the gas is finally supplied through the auxiliary inlet.

The auxiliary inlet is composed of a first inlet 81, a second inlet 82 and a third inlet 83, the first inlet 81 is in communication with the inlet 6 and vertical to the inlet 6 (the broken line in the FIG. 12 shows that the first inlet 81 is in communication with the inlet 6), the second inlet 82 can communicate the auxiliary inlet hole 33 when the valve core 3 rotates relative to the valve body 1 (FIG. 12 shows this situation), the third inlet 83 is in communication with the first inlet 81 and the second inlet 82, and the third inlet 83 has an external end in communication with the outside. A screw 9 is inserted into the external end of the third inlet 83. The screw 9 has a front portion 91 located at a joint between the second inlet 82 and the third inlet 83, the flow rate of the gas flowing from the first inlet 81 to the second inlet 82 through the third inlet 83 can be adjusted by the screw 9. Therefore, a skilled person in the art can understand that the auxiliary inlet is not necessarily composed of the above three inlets, and can also be composed of two inlets or more, as long as the screw for adjusting the flow rate of the gas in the inlet is mounted at the joint of between the multiple inlets, that is, the first inlet 81 and the third inlet 83 can be also be of an integral configuration or the third inlet 83 extends in the same direction as the first inlet 81.

As shown in FIG. 5, FIG. 6, FIG. 8 and FIG. 9, the third inlet 83 is vertical to the second inlet 82, or intercrossed to form a certain angle. A through hole 92 is defined in the front portion 91 transversal to an axis of the screw 9, a hole 93 is defined in the front surface along the axis of the screw 9, the hole 93 is in communication with the through hole 92, and the hole 93 has a diameter smaller than the diameter of the joint between the second inlet 82 and the chamber 2 of the valve body 1, that is, the diameter of the hole 93 is smaller than the diameter of the joint between the auxiliary inlet and valve body 1.

The third inlet 83 has a stepped structure, and comprises a first segment 831 having a smaller inner diameter close to the first inlet 81 and a second segment 832 having a larger inner diameter close to the second inlet 82, the screw 9 is inserted toward the first segment 831 from the second segment 832, the joint between the second inlet 82 and the third inlet 83 is located on the second segment 832 and near a junction between the first segment 831 and the second segment 832. The screw 9 has a spiral portion with an outer diameter matching with an inner diameter of the second segment 832 for blocking the third inlet 83, and the front portion 91 has an outer diameter smaller than that of the spiral portion and larger than an inner diameter of the first segment 831. The front portion 91 of the screw 9 has a front end in truncated cone shape, and the front end has a diameter smaller than the inner diameter of the first segment 831, so that the adjusting screw 9 can block the first segment 831. Preferably, the screw 9 is threaded to the second segment 832, the front portion 91 of the screw has a height larger than the height between the joint between the second inlet 82 and the third inlet 83 and the junction between the first segment 831 and the second segment 832. The screw 9 can move inside the third inlet 83 to adjust the flow rate, so that when the screw 9 is rotatably inserted into the third inlet 83, the front end of the front portion 91 of the screw 9 is inserted into the first segment 831 and blocks the first segment 83, thus the gas passing through the first segment 831, the hole 9 defined in the front surface of the adjusting screw 93 into the through hole 92 so as to enter the second inlet 82; when the screw 9 is rotated away from the third inlet 83, the front end of the front portion 91 of the screw 9 moves out from the first segment 831, a part of the gas enters into the second segment 832 through the first segment 831 and further enters into the second inlet 82 through the hole 93 of the screw 9 and the through hole 92, and the other part of the gas can bypass the screw 9 and directly enter the second segment 832 from the first segment 831 to enter the second inlet 82. Therefore, under the adjustment of the screw 9, the gas flow rate from the third inlet 83 to the second inlet 82 can be adjusted, in order to adapt to different gases.

The screw 9 has a rear portion 94 with an outer diameter larger than the outer diameter of the spiral portion, the second segment 832 has an outer end, the third inlet 83 further comprise a third segment 833 with a larger diameter attached to the outer end of the second segment 832, the rear portion 94 is located at the third segment 833 and clamped at the outer end of the second segment 832. Therefore, the screw 9 can be limited when moving inside the third inlet 83.

The gas valve can adjust the flow rate of the gas in the inlets to enable the gas valve to the gas valve to adapt to different gas supplies; the gas valve with the separated inlet hole and auxiliary inlet hole can reduce the operational error during the adjustment of the gas flow rate; the adjustment of the gas flow rate is more conveniently and simply, and the requirements on processing the gas valve are low, which is easy for manufacturing and production, and the production efficiency is improved.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended claims.

The invention claimed is:

1. A gas valve comprising:
   a valve body having a chamber and an inlet, the inlet connecting outside with the chamber;
   a valve core rotatably disposed inside the chamber, the valve core having a center hole, a peripheral surface, and an inlet hole defined in the peripheral surface of the valve core and capable of aligning with the inlet of the valve body;
   wherein
   an auxiliary inlet with two ends is defined in the valve body linking the inlet with the chamber of the valve body, the auxiliary inlet is composed of a first inlet, a second inlet, and a third inlet;
   an adjusting mechanism is disposed inside the auxiliary inlet for adjusting a flow rate of the gas passing through the auxiliary inlet, the adjusting mechanism is a screw located at a joint between the second inlet and the third inlet, the screw is inserted into the third inlet;
   the screw has a front portion, a through hole is defined in the front portion transversal to an axis of the screw, a hole is defined in the front surface along the axis of the screw, the hole is in communication with the through hole, the screw can move inside the third inlet to adjust the flow rate;
   an auxiliary inlet hole is defined in the peripheral surface of the valve core and capable of aligning with the auxiliary inlet, both the auxiliary inlet hole and the inlet hole are in communication with the center hole of the valve core, and the auxiliary inlet hole is defined away from the inlet hole;
   when the inlet hole of the valve core is in communication with the inlet, the auxiliary inlet hole is not in communication with the auxiliary inlet,
   when the auxiliary inlet hole is in communication with the auxiliary inlet, the inlet hole of the valve core is not in communication with the inlet, the first inlet is in communication with the inlet, the second inlet can communicate with the auxiliary inlet hole, the third inlet is in communication with the first inlet and the second inlet, and the third inlet has an external end in communication with the outside;
   wherein the third inlet is a stepped hole, and further comprises a first segment having a smaller inner diameter close to the first inlet and a second segment having a larger inner diameter close to the second inlet,
   the joint between the second inlet and the third inlet is located on the second segment and near a junction between the first segment and the second segment, the screw is inserted toward the first segment from the second segment, the screw has a spiral portion with an outer diameter matching with an inner diameter of the second segment for blocking the third inlet, and the front portion has an outer diameter smaller than that of the spiral portion and larger than an inner diameter of the first segment.

2. The gas valve of claim 1, wherein the front portion of the screw has a front end in truncated cone shape, and the front end has a diameter smaller than the inner diameter of the first segment.

3. The gas valve of claim 2, wherein the screw has a rear portion with an outer diameter larger than the outer diameter of the spiral portion, the second segment has an outer end, the third inlet further comprise a third segment attached to the outer end of the second segment, the rear portion is located at the third segment and clamped at the outer end of the second segment.

* * * * *